US012780221B2

(12) United States Patent
Jang

(10) Patent No.: US 12,780,221 B2
(45) Date of Patent: Nov. 3, 2026

(54) METHOD FOR PROVIDING VEHICLE PET MODE

(71) Applicant: PETPULS LAB INC., Anyang-si (KR)

(72) Inventor: Yun Ock Jang, Anyang-si (KR)

(73) Assignee: PETPULS LAB INC., Anyang-si (KR)

( * ) Notice: Subject to any disclaimer, the term of this patent is extended or adjusted under 35 U.S.C. 154(b) by 6 days.

(21) Appl. No.: 19/176,295

(22) Filed: Apr. 11, 2025

(65) Prior Publication Data

US 2025/0282364 A1 Sep. 11, 2025

Related U.S. Application Data

(63) Continuation of application No. PCT/KR2022/016218, filed on Oct. 24, 2022.

(30) Foreign Application Priority Data

Oct. 14, 2022 (KR) ........................ 10-2022-0132152

(51) Int. Cl.
*B60W 50/00* (2006.01)
*B60K 35/10* (2024.01)
(Continued)

(52) U.S. Cl.
CPC ......... *B60W 50/0098* (2013.01); *B60K 35/10* (2024.01); *B60W 40/08* (2013.01);
(Continued)

(58) Field of Classification Search
CPC ........ B60K 2360/164; B60K 2360/573; B60K 2360/5911; B60K 35/00; B60K 35/10;
(Continued)

(56) References Cited

U.S. PATENT DOCUMENTS

2022/0222949 A1* 7/2022 Lv .......................... B60R 25/305
2025/0322672 A1* 10/2025 Cho ................. G10K 11/17873

FOREIGN PATENT DOCUMENTS

KR 10-1256054 B1 4/2013
KR 10-2018-0096369 A 8/2018
(Continued)

OTHER PUBLICATIONS

Examiner, "International Search Report of PCT/KR2022/016218", Jul. 11, 2023, KIPO, Republic of Korea.

*Primary Examiner* — Charles J Han
(74) *Attorney, Agent, or Firm* — Bridgeway IP Law Group, PLLC; Jihun Kim

(57) ABSTRACT

An embodiment relates to a method for providing a pet mode in a vehicle, which is executed by a system, comprising: (a) a step of establishing communication between a user terminal and an infotainment system of the vehicle; (b) a step in which a pet sound collection unit of the user terminal collects sound information occurring inside the vehicle when a pet is present therein, and transmits the collected sound information to a server; (c) a step in which the server classifies the received sound information into pet sounds and non-pet sounds based on a preset algorithm; (d) a step in which the server determines the emotional state of the pet with reference to a preset pet emotion state table, based on the sound classified as a pet sound.

10 Claims, 5 Drawing Sheets

(51) Int. Cl.

| | |
|---|---|
| ***B60W 40/08*** | (2012.01) |
| ***H04W 4/40*** | (2018.01) |
| ***H04W 4/80*** | (2018.01) |

(52) U.S. Cl.
CPC ............... *H04W 4/40* (2018.02); *H04W 4/80* (2018.02); *B60K 2360/164* (2024.01); *B60K 2360/573* (2024.01); *B60K 2360/5911* (2024.01); *B60W 2040/0881* (2013.01); *B60W 2040/089* (2013.01); *B60W 2420/54* (2013.01); *B60W 2540/01* (2020.02); *B60W 2540/21* (2020.02); *B60W 2540/22* (2013.01); *B60W 2556/45* (2020.02)

(58) Field of Classification Search
CPC .................. B60K 35/28; B60W 10/30; B60W 2040/0881; B60W 2040/089; B60W 2420/54; B60W 2540/01; B60W 2540/21; B60W 2540/22; B60W 2556/45; B60W 40/08; B60W 50/0098; H04W 4/40; H04W 4/80
See application file for complete search history.

(56) References Cited

FOREIGN PATENT DOCUMENTS

| | | | |
|---|---|---|---|
| KR | 10-2019-0125668 | A | 11/2019 |
| KR | 10-2020-0104881 | A | 9/2020 |
| KR | 10-2022-0070153 | A | 5/2022 |
| KR | 10-2022-0135571 | A | 10/2022 |
| WO | 2020-045789 | A1 | 3/2020 |

* cited by examiner

METHOD FOR PROVIDING VEHICLE PET MODE

CROSS-REFERENCE TO RELATED APPLICATION

This application is a Continuation of PCT Patent Application No. PCT/KR2022/016218 filed on Oct. 24, 2022, which claims priority to Korean Patent Application No. 10-2022-0132152 filed in the Korean Intellectual Property Office on Oct. 14, 2022, the entire contents of which are incorporated herein by reference.

BACKGROUND

1. Technical Field

The present invention relates to a method for providing pet mode in a vehicle, and more particularly, to a method and system for identifying the emotional state of a pet inside the vehicle through a user terminal connected to the vehicle's infotainment system and performing corresponding pet care actions.

2. Description of the Related Art

Recently, the number of households raising pets has been increasing, and as more people go camping or traveling with their pets, various pet-related options for vehicles have also become available.

For example, accessory packages such as pet-exclusive car seats and mats have been released, and furthermore, products equipped with vehicle control software designed for pets are also being introduced.

However, pets are intelligent living beings, and when confined in narrow and enclosed spaces such as vehicles, they may experience negative emotions. These emotions can lead to unusual behaviors—such as urination, defecation, howling, and barking—that may disturb others.

Therefore, there is a need for a method or system capable of caring for pets during vehicle rides to prevent them from experiencing negative emotions.

SUMMARY

The present invention aims to address the problems of the prior art by providing a method or system that can care for a pet when it is on board a vehicle, thereby preventing the pet from feeling negative emotions and acting unusually in ways that may cause disturbances.

Additionally, the purpose of this invention is not merely to restrain or control the pet during the process of providing the above method, but rather to understand the pet's emotional state and provide appropriate responses, so that the pet does not develop negative feelings toward being in the vehicle.

The problems to be solved by the present invention are not limited to those mentioned above, and other objectives not explicitly stated will be clearly understood from the following description.

As a technical means for achieving the aforementioned objectives, a method for providing a pet mode in a vehicle, performed by a system according to one embodiment of the present invention, comprises: (a) establishing a communication connection between a user terminal and the vehicle's infotainment system; (b) collecting, via a pet sound collection unit of the user terminal, sound information generated inside the vehicle when a pet is present in the vehicle, and transmitting the collected sound information to a server; (c) classifying the received sound information into pet vocalizations and other sounds by the server based on a predefined algorithm; (d) determining the emotional state of the pet by the server, referencing a predefined pet emotion state table for the classified pet vocalizations; (e) transmitting, from the server to the user terminal, a command signal to control at least one of a sound output unit, a temperature control unit, a window, a sunroof, and a feeding unit of the vehicle, according to a predefined algorithm corresponding to the pet's emotional state; and (f) transmitting the command signal from the user terminal to the infotainment system, and controlling the vehicle by the infotainment system. The command signal may include identification information and operation information regarding the control target within the vehicle.

The pet sound collection unit may include a voice recognition device installed inside the vehicle and connected via wired or wireless communication, an embedded vehicle infotainment system microphone, and a microphone device of the user terminal connected via Bluetooth to the vehicle. The unit may further comprise a plurality of microphones configured to receive noise, human voice, and pet vocalizations and convert them into electrical sound signals.

Step (c) may include: (c-1) filtering the sound information to detect the owner's voice; and (c-2) filtering the remaining sound information, excluding the owner's voice, to remove noise generated by the vehicle's operation.

In addition, step (c-1) may detect a voice section in the sound information through Voice Activity Detection (VAD).

In addition, in step (c-2), the filtering may sequentially apply a Karhunen-Loeve Transform (KLT)-based filter using the Kuhn-Tucker condition and the Lagrangian multiplier, and a Speech Distortion Weighted Multi-channel Wiener Filter (SDW-MWF) to extract the owner's voice.

Further, step (c) may be performed when the server determines that only a pet is present inside the vehicle. The server may determine that only a pet is present if it recognizes that the collected sound signal does not include the user's voice.

Additionally, in step (c-2), the noise caused by the vehicle's operation may be pre-stored in the server by driving status and vehicle model. The driving status may be classified into four states—P, D, R, and N—based on the transmission gear of the vehicle, and for each driving status, the predefined speed and noise level of the vehicle may be stored.

Moreover, in step (d), the pet emotion state table may be pre-stored in the server. The table may match multiple pet emotional states with the pitch of the pet vocalizations, the number of repetitions per preset time, and the duration for which the vocalizations are sustained.

The plurality of pet emotional states may include hunger, fear, aggression, defensive posture, excitement, longing, physical satisfaction, emotional satisfaction, request for help, boredom, pain, and lethargy.

Furthermore, in step (e), the sound output unit may play the owner's voice corresponding to the pet's emotional state, which is pre-stored in the server, according to a command signal from the server. The temperature control unit may adjust the temperature of the air conditioner based on a command signal corresponding to the pet's emotional state, and in cases where the window and sunroof are partially open in a crisscross manner, the air conditioner may operate in ventilation mode.

The windows and sunroof may be controlled to open and close based on a command signal from the server, and among the plurality of vehicle windows, two may be opened in a crisscross manner around the vehicle's center, ensuring that the openings do not exceed the size of the pet's head.

The feeding unit may control the operation of a feeding device and a watering device according to a command signal corresponding to the pet's emotional state, which is prestored in the server.

The method may further include: (g) providing the classified pet emotional state and information on the operations of the sound output unit, temperature control unit, and feeding unit, which are controlled by the server, to the user terminal.

A system for providing pet mode in a vehicle according to an embodiment of the present invention may include: a user terminal communicatively connected to the infotainment system of the vehicle and configured to transmit a command signal to the infotainment system so that the infotainment system controls the vehicle; a pet sound collection unit configured to collect sound information generated inside the vehicle when a pet is present in the vehicle and to transmit the collected sound information to a server; and a server configured to classify the received sound information into pet vocalizations and non-pet sounds according to a preset algorithm, to determine the emotional state of the pet with reference to a preset pet emotion state table for the pet vocalizations, and to transmit a command signal to the user terminal for controlling at least one of a sound output unit, a temperature control unit, windows, a sunroof, and a feeding unit in the vehicle, according to a preset algorithm based on the pet's emotional state, wherein the command signal may include identification information and operation information regarding the control target(s) inside the vehicle.

According to the method and system for providing pet mode in a vehicle of the present invention, the emotional state of a pet can be identified when the pet is on board the vehicle.

In addition, by providing a predetermined response plan based on the identified emotional state, it is possible to prevent the pet from feeling negative emotions, thereby preventing the pet from becoming afraid of or reluctant to ride in the vehicle.

Furthermore, if the pet exhibits abnormal behavior different from usual, the cause of such behavior can be identified through the detection of emotional states as described above, thereby guiding the pet to refrain from abnormal behavior when riding in the vehicle.

DETAILED DESCRIPTION

Figure 1:
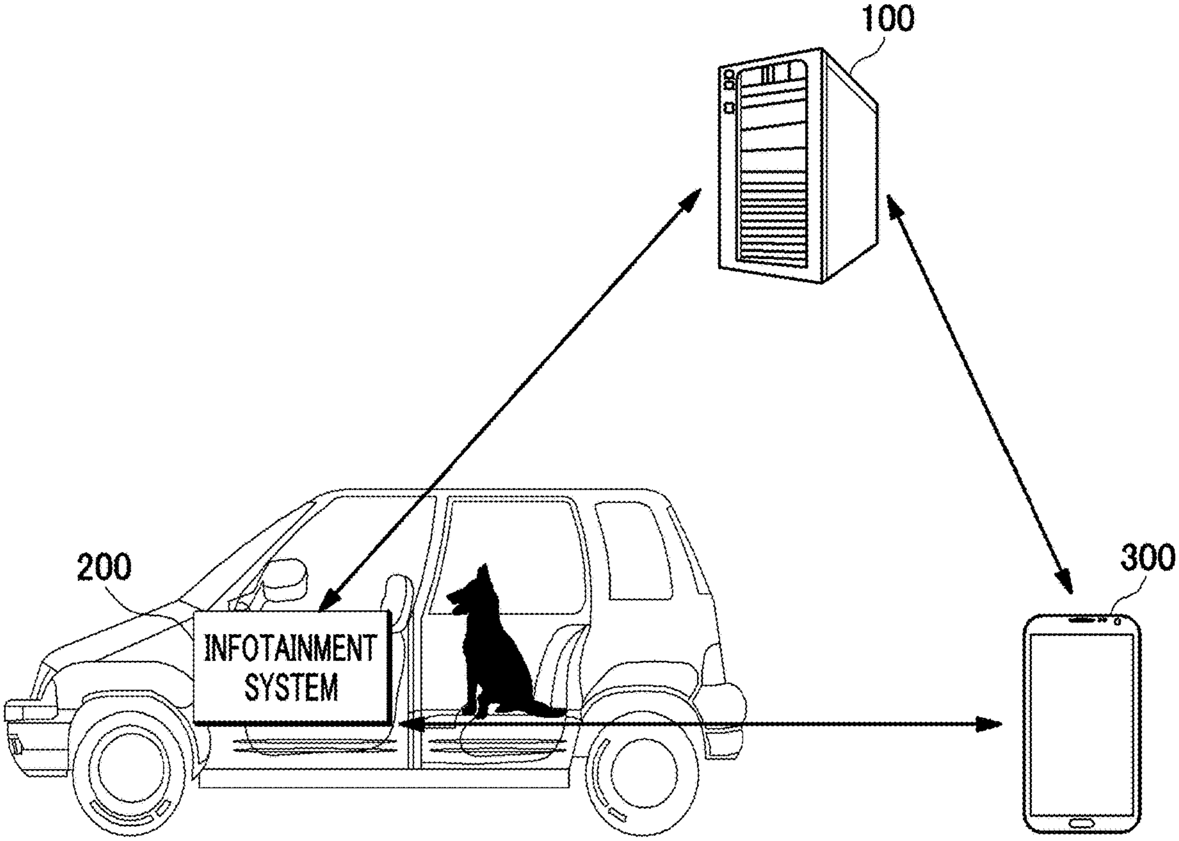
FIG. 1 is a structural diagram of a system for providing pet mode in a vehicle according to an embodiment of the present invention.

Hereinafter, exemplary embodiments of the present invention will be described in detail with reference to the accompanying drawings so that those skilled in the art to which the present invention pertains can easily implement the invention. However, the present invention may be implemented in various other forms, and is not limited to the embodiments described herein. In the drawings, parts not related to the description are omitted for clarity, and similar reference numerals are assigned to similar parts throughout the specification.

In the entire specification, when a part is said to be "connected" to another part, it includes not only cases where they are "directly connected," but also cases where they are "electrically connected" with other elements interposed therebetween. In addition, when a part is said to "include" a component, it means that it may further include other components unless otherwise specifically stated to the contrary.

In this specification, the term "unit" refers to a component realized by hardware, a component realized by software, or a component realized using both. One unit may be realized by two or more pieces of hardware, and two or more units may be realized by a single piece of hardware. The term "unit" is not limited to either software or hardware, and may be configured to reside on an addressable storage medium or to be executed by one or more processors. For example, a "unit" may include software components, object-oriented software components, class components, and task components, as well as processes, functions, attributes, procedures, subroutines, segments of program code, drivers, firmware, microcode, circuits, data, databases, data structures, tables, arrays, and variables. The functionalities provided in the components or "units" may be combined into fewer components or "units," or further separated into additional components or "units." Additionally, the components or "units" may be implemented to execute one or more CPUs in a device or a secure multimedia card.

The term "terminal" referred to hereinafter may be implemented as a computer or a portable terminal capable of connecting to a server or another terminal via a network. The computer may include, for example, a notebook, desktop, or laptop equipped with a web browser, or VR HMDs (e.g., HTC VIVE, Oculus Rift, GearVR, DayDream, PSVR, etc.). VR HMDs may include PC-based models (e.g., HTC VIVE, Oculus Rift, FOVE, Deepon), mobile models (e.g., GearVR, DayDream, Baofeng Mojing, Google Cardboard), console models (e.g., PSVR), and standalone models (e.g., Deepon, PICO, etc.).

The portable terminal may include wireless communication devices that guarantee portability and mobility, such as smartphones, tablet PCs, and wearable devices, as well as various devices equipped with communication modules such as Bluetooth Low Energy (BLE), NFC, RFID, ultrasonic, infrared, WiFi, or LiFi.

The "network" refers to a connection structure that enables information exchange between respective nodes such as terminals and servers. It may include a Local Area Network (LAN), Wide Area Network (WAN), the Internet (WWW), wired and wireless data communication networks, telephone networks, and wired and wireless television communication networks.

Examples of wireless data communication networks include, but are not limited to, 3G, 4G, 5G, 3GPP (3rd Generation Partnership Project), LTE (Long Term Evolution), WiMAX (World Interoperability for Microwave Access), Wi-Fi, Bluetooth communication, infrared communication, ultrasonic communication, visible light communication (VLC), and LiFi.

Hereinafter, a system for providing a pet mode in a vehicle according to an embodiment of the present invention will be described with reference to FIG. 1.

The system for providing a pet mode in a vehicle according to an embodiment of the present invention may include a server (100), an infotainment system (200) installed or embedded in a vehicle, and a user terminal (300).

According to the present invention, the user terminal (300) may be connected to the infotainment system (200) through Bluetooth pairing and wireless internet-based communication, thereby allowing the user terminal (300) to perform a role of collecting data from the interior of the vehicle together with the infotainment system (200). The user terminal (300) may also perform a role of transmitting the collected information to the server (100) via wired or wireless communication.

The infotainment system (200) according to an embodiment of the present invention is an integrated multimedia system combining the concepts of "information" and "entertainment." In addition to traditional functions such as navigation and audio, it is a device that enables the user to check various types of information provided by the vehicle and to operate various vehicle functions. It may also include server (100)—based voice recognition functionality and OTA (Over-The-Air) technology for wirelessly updating navigation information and software.

The user terminal (300) may be a smartphone, tablet PC, laptop, or desktop capable of wired or wireless communication with the server (100) and the vehicle's infotainment system (200), and may have installed thereon a program or application for performing the pet mode provision method in a vehicle according to an embodiment of the present invention.

Figure 2:
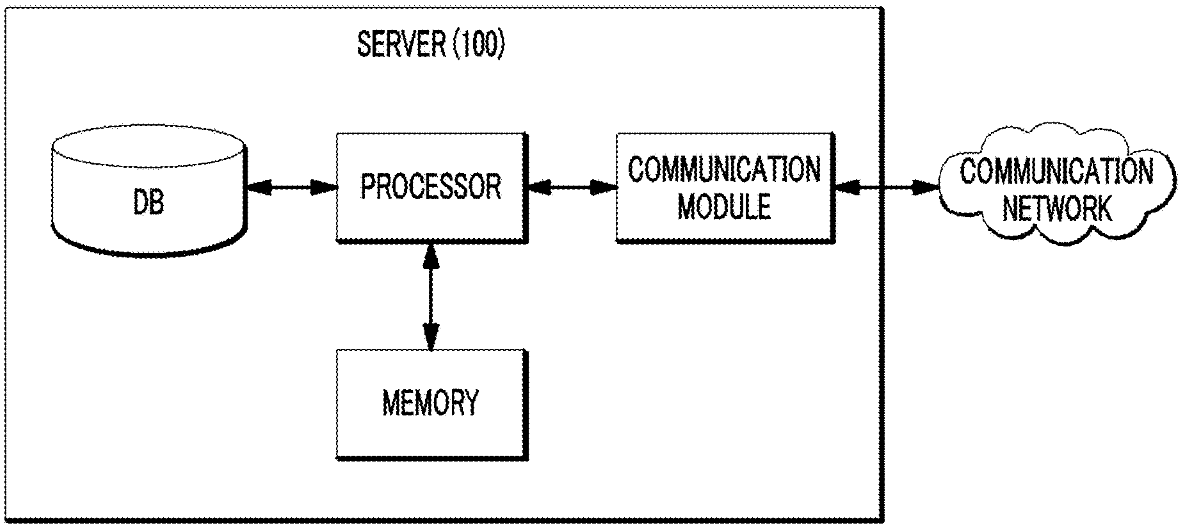
FIG. 2 is a block diagram showing the internal configuration of a server according to an embodiment of the present invention.

Referring to FIG. 2, the server (100) according to an embodiment of the present invention may include a memory in which a program (or application) for performing the pet mode provision method in a vehicle is stored, and a processor that executes the program. The processor may perform various functions according to the execution of the program stored in the memory. The functions performed by the server (100) will be described in detail later.

Hereinafter, an embodiment of the method for providing a pet mode in a vehicle, which is performed by the above-described system, will be explained.

First, the user terminal (300) and the vehicle's infotainment system (200) are communicatively connected. The communication connection may include wired or wireless connections and, in a preferred embodiment, may be established via Bluetooth pairing.

Through the above-described connection, the user terminal (300) performs the function of a pet sound acquisition unit (210). The pet sound acquisition unit (210) collects sound information generated inside the vehicle when a pet is present and transmits the collected sound information to the server (100).

The pet sound acquisition unit (210) according to an embodiment of the present invention may include a voice recognition device installed in the vehicle and connected via wired or wireless communication, a built-in microphone of the vehicle's infotainment system (200), and a microphone device of the user terminal (300) connected to the vehicle via Bluetooth. It may include a plurality of microphones that receive noise and voice from specific sound sources and pet vocalizations generated inside the vehicle and convert them into electrical audio signals.

For example, assuming the user terminal (300) is a smartphone with a built-in microphone device, after Bluetooth pairing between the vehicle's infotainment system (200) and the smartphone, the microphone device of the smartphone receives the noise, specific source voice, and pet vocalizations generated inside the vehicle, converts them into electrical audio signals, and transmits them to the server (100) via wireless communication means such as LTE or Wi-Fi.

The sound information received by the server (100) through the above-described process is classified into pet vocalizations and other sounds according to a predetermined algorithm.

At this time, the server (100) filters the sound information based on a predetermined algorithm to detect the owner's voice, and then filters the remaining sound information to remove noise generated by the operation of the vehicle.

The process of detecting the owner's voice by filtering the sound information at the server (100) may be performed by detecting voice segments in the sound information using VAD (Voice Activity Detection).

Since VAD is a technology applied to voice processing to detect the presence or absence of human speech and is a known prior art, detailed description thereof will be omitted.

Next, the operation of filtering the remaining sound information, excluding the owner's voice, to remove noise caused by vehicle operation may be performed by sequentially applying a KLT (Karhunen-Loeve Transform)-based filter using the Kuhn-Tucker condition and Lagrangian multiplier, and an SDW-MWF (Speech Distortion Weighted Multi-channel Wiener Filter) to extract the owner's voice.

The method using a Karhunen-Loeve Transform (KLT)-based filter is a noise reduction technique that utilizes the subspace of a covariance matrix. The mathematical expression used for noise reduction is as follows:

$$y = x + d \quad \text{[Equation 1]}$$

In Equation 1, x represents the speech signal, d denotes noise, and y refers to the audio signal received through the microphone. Using this algorithm, a filter gain H is obtained and applied to y to estimate the speech signal.

$$\text{error} = \hat{x} - x = (H - I)x + Hd = r_x + r_d \quad \text{[Equation 2]}$$

Next, the actual error can be represented using the method shown in Equation 2. Since minimizing this error brings the result closer to the intended value, the objective is to minimize $r_x$ and rd. To achieve this, if $r_x$ is minimized while rd is fixed to a certain value in Equation 2, the optimal value of H can be derived using the Kuhn-Tucker condition and Lagrangian multipliers. For simplicity of computation, Equation 2 can be transformed into the following Equation 3.

$$H_{opt} = R_x(R_x + \mu R_d)^{-1} = V^{-T} G V^{T} \quad \text{[Equation 3]}$$

In the above equation, $R_x$ is the covariance matrix of the speech signal, and Rd is the covariance matrix of the noise signal. V is the eigenvector of $\Sigma = R\_d^{-1} R_x$. The value G is a diagonal matrix, which can be expressed as shown in Equation 4.

$$g(k) = \begin{cases} \frac{\lambda_{\Sigma}(k)}{\lambda_{\Sigma}(k) + \mu}, & k = 1, 2, \ldots M \\ 0, & k = M+1, \ldots K \end{cases} \quad \text{[Equation 4]}$$

In Equation 4, K denotes the frame size of the overall signal, and M refers to the number of positive eigenvalues of Σ. Therefore, the gain of the KLT-based filter is ultimately derived, enabling noise removal.

Following the above-described process, the server (100) further filters the already processed acoustic signal using SDW-MWF (Speech Distortion Weighted Multi-channel Wiener Filter).

That is, the server (100) can remove noise from signals—already filtered through the KLT-based filter in each single channel (i.e., each microphone)—by applying SDW-MWF that utilizes multi-channel characteristics.

The main principle of the Wiener filter is to derive a filter gain H that satisfies the MMSE (Minimum Mean Square Error) criterion.

The result obtained from the KLT-based filter is converted into the frequency domain via STFT (Short-Time Fourier Transform), and is expressed as in Equation 5 below.

$$Y_i^F(\omega_k) = X_i^F(\omega_k) + D_i^F(\omega_k) \quad \text{[Equation 5]}$$

Equation 5 represents the input signal, speech signal, and noise signal at the k-th frequency bin of the i-th microphone. Each microphone signal, expressed in the same manner as Equation 5, can be collectively represented as a single vector. Using this expression, noise can be selectively removed.

$$J_2 = E\{|\text{error}_i^F(\omega_k)|^2\} = E\{[X_i^F(\omega_k) - H_i^F(\omega_k)Y_i^F(\omega_k)]\} \quad \text{[Equation 6]}$$

The server (100) obtains a filter gain that minimizes the MMSE using the approach described in Equation 6. The filter gain H can be derived by performing partial differentiation with respect to H, and is expressed as shown in Equation 7.

$$H_i^F(\omega_k) = R_{yy}^{-1}(\omega_k)(R_{yy}(\omega_k) - R_{dd}(\omega_k))e_i \quad \text{[Equation 7]}$$

In Equation 7, e is a vector used to select the microphone for filtering, and Ryy, Rdd denote the autocorrelation matrices of the input signal (speech) and the noise signal, respectively. Equation 7 represents the final filter gain of the MWF (Multi-channel Wiener Filter). However, in general, noise reduction algorithms have a trade-off between filtering performance and the distortion of the final signal. SDW-MWF (Speech Distortion Weighted MWF) is a method that allows this trade-off to be adjusted by expanding Equation 7 and applying a weighting factor to the noise component of the formula. This filter gain can be expressed as shown in Equation 8.

$$H_i^F(\omega_k) = (R_{xx}(\omega_k) + \mu R_{dd}(\omega_k))^{-1} R_{xx}(\omega_k)e_i \quad \text{[Equation 8]}$$

Equation 8 represents the final filter gain calculated by the server (100). By multiplying the result of the KLT-based filter—used for initial noise reduction—with Equation 8, the server (100) can estimate the final speech signal.

Through the aforementioned process, the server (100) can distinguish between the pet's vocalizations and other sounds (including human voices and background noise) from the audio collected by the pet sound collection unit.

Accordingly, the server (100) may determine that no pet is present in the vehicle if the collected audio includes no pet vocalizations—or if non-pet sounds exceed a predetermined threshold of the total collected audio. Conversely, if pet vocalizations exceed the predetermined threshold, the server (100) may determine that a pet is present in the vehicle.

According to an additional embodiment of the present invention, if the server (100) recognizes only pet vocalizations and no human voices from the collected audio signals, it may determine that only the pet is present in the vehicle. In such cases, the server may proceed to distinguish between pet sounds and other sounds (in this case, noise only, without human voice) using the predetermined algorithm.

Furthermore, in another embodiment of the invention, during the noise reduction process using the acquired filter gain, the server (100) may take into account pre-stored noise profiles corresponding to various vehicle models and driving states, recorded prior to implementation of the invention.

In this case, the server (100) may store four driving states—P (Park), D (Drive), R (Reverse), and N (Neutral)—classified based on the vehicle's transmission gear, along with predefined vehicle speeds and associated noises for each state and vehicle model. During filtering, the server (100) may apply the pre-stored noise data immediately after audio collection, performing a scaling operation (adjusting the amplitude without altering the frequency characteristics) and then removing such noise from the collected audio as a first step.

For example, the server (100) may store, in its database, the noise patterns and noise levels corresponding to a 2020 Avante XD model vehicle when the gear is in reverse (R) and the driving speed is between 10 km/h and 20 km/h. When the infotainment system (200) of the vehicle connects with the user terminal (300), and the current driving condition of the vehicle matches the aforementioned scenario (gear R and speed between 10 km/h and 20 km/h), the server (100) may scale the corresponding noise pattern using a predetermined algorithm and remove it from the collected audio information, thereby prioritizing the removal of noise generated during vehicle operation.

Through the above process, for the audio identified as pet vocalizations, the server (100) refers to a predetermined pet emotional state table to determine the emotional state of the pet.

Figure 4:
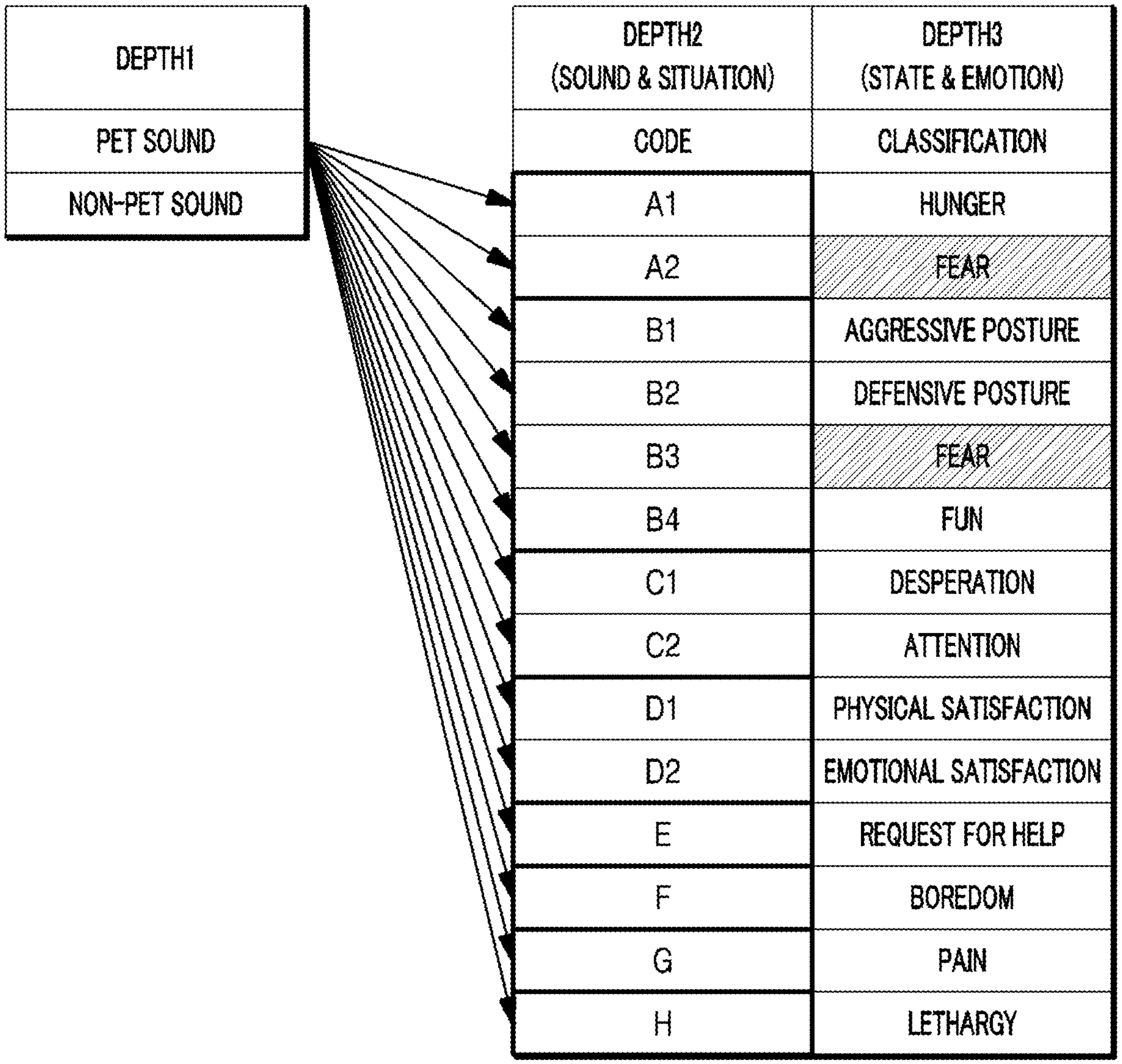
FIG. 4 is an example diagram of a pet emotional state table according to an embodiment of the present invention.

Referring to FIG. 4, a table matching multiple pet emotional states with characteristics such as pitch of the pet's vocalizations, number of repetitions per preset time, and duration maintained within a preset time may be pre-stored in the server (100).

According to an embodiment of the present invention, the pet emotional state table may include a plurality of pet states such as hunger, fear, aggressive posture, defensive posture, playfulness, yearning, physical satisfaction, emotional satisfaction, request for help, boredom, pain, and lethargy. Each state may be associated with a corresponding command signal (code) stored in the table.

In this case, the command signal may include identification and operation information related to a control target in the vehicle. The server (100) may use the command signal to control at least one of the audio output unit (220), temperature control unit (230), windows, sunroof, or feeding unit (240) by sending the command to the user terminal (300).

Figure 3:
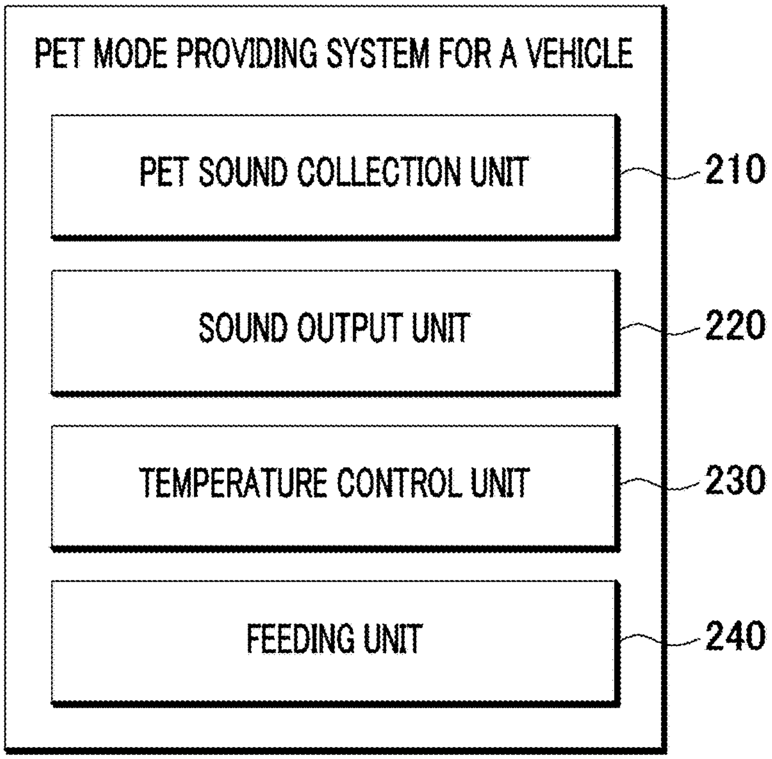
FIG. 3 is an exemplary diagram of the configuration of a system for providing pet mode according to an embodiment of the present invention.

Referring to FIG. 3, the pet mode providing system according to an embodiment of the present invention may include, in addition to the aforementioned pet sound collection unit (210), the audio output unit (220), temperature control unit (230), and feeding unit (240).

The pet mode providing system may also include the vehicle's infotainment system (200), where the user terminal (300) transmits the command signal received from the server (100) to the infotainment system (200), and the infotainment system (200) controls the vehicle accordingly.

Among the components being controlled, the audio output unit (220) may output the pet owner's voice corresponding to the emotional state of the pet, which has been pre-stored in the server (100).

For example, if the server (100) determines that the emotional state of the pet is fear, the server (100) may transmit the pet owner's voice corresponding to that emotional state (e.g., a soothing voice such as "It's okay") through the speaker of the vehicle's infotainment system (200) or the user terminal (300).

According to an additional embodiment of the present invention, the voice corresponding to each emotional state may be recorded by the user (i.e., the pet owner) via the recording function of the user terminal (300) prior to use, and transmitted to and stored in the server (100). Furthermore, after initial use, the voice may be updated via the user terminal (300).

Next, the temperature control unit (230) may adjust the air conditioning temperature according to the air conditioner command signal corresponding to the pet's emotional state stored in the server (100). If the windows and sunroof are already partially open for ventilation, the air conditioner may also be activated to accelerate the ventilation process, enabling faster air circulation.

The windows and sunroof are controlled to open or close according to the command signal, ensuring that neither the windows nor the sunroof are opened wider than the size of the pet's head, thus preventing the pet from escaping the vehicle during ventilation.

Additionally, two of the vehicle's multiple windows may be opened in a crosswise manner based on the centerline of the vehicle—for example, the driver's side front window and the opposite rear passenger-side window (left front and right rear in Korea).

This is because air pressure is lower at the top of the front window and relatively higher at the rear, making it most effective to open the driver's front and opposite rear passenger windows for ventilation.

Next, the feeding unit (240) may operate the feeder and water dispenser when the pet's emotional state is hunger or thirst, thereby alleviating the pet's hunger or thirst.

Information about the detected emotional state of the pet and the corresponding operation of each component may be provided to the user terminal (300) by at least one of the server (100) or the infotainment system (200).

In other words, the user may receive not only the pet's emotional state but also information about the type and time of the care actions provided in response to that state via the user terminal (300).

Figure 5:
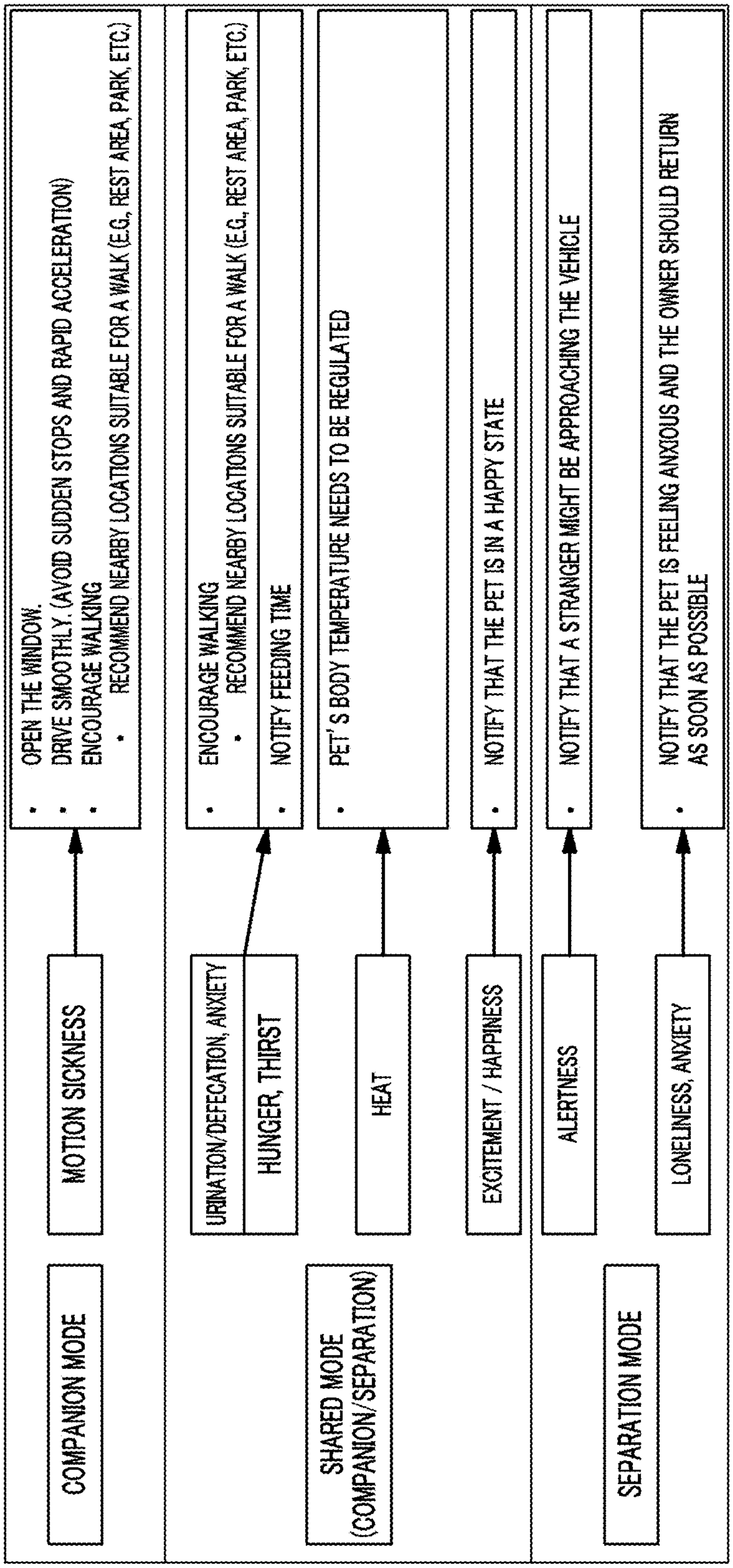
FIG. 5 is an exemplary diagram of the service provided by the method for providing pet mode in a vehicle according to an embodiment of the present invention.

According to another embodiment of the present invention, the pet mode may be provided in three modes—companion mode, shared mode, and separation mode—based on audio analysis. Referring to FIG. 5, the companion mode is provided when it is determined that both the pet and the guardian are in the vehicle. If the pet is experiencing motion sickness, the window may be opened, or the user terminal (300) may recommend that the guardian drive in a more stable manner or take a short break (e.g., a walk).

In this case, stable driving may involve a recommendation to avoid sudden stops and rapid acceleration. For walks, the user terminal (300) may use GPS information to suggest nearby resting spots (such as rest areas or parks) within a preset distance.

On the other hand, the separation mode is provided when only the pet is present in the vehicle, and the guardian is absent. This mode may be useful when the guardian needs to briefly enter a building or store that does not allow pets.

Although leaving a pet alone in a vehicle for an extended period is discouraged, in unavoidable cases as described above, if the system detects emotional states such as alertness, loneliness, or anxiety, and determines that the pet is in an alert state, the server (100) may collect images of the vehicle's surroundings through the black box or camera device of the vehicle via the infotainment system (200) and send an alert message to the user terminal (300) indicating that a stranger is approaching the vehicle.

Additionally, if the pet is in a state of loneliness or anxiety, the system may send a message to the user terminal (300) informing them of the pet's emotional condition.

The shared mode may be provided in both the companion and separation modes when the pet is judged to be in a state of needing to relieve itself, hunger, thirst, feeling hot, enjoyment, or happiness.

In this case, the system may control at least one of the audio output unit (220), temperature control unit (230), windows, sunroof, and feeding unit (240) to alleviate the pet's condition. The actions taken and the pet's emotional state information may be provided to the user terminal (300).

Figure 6:
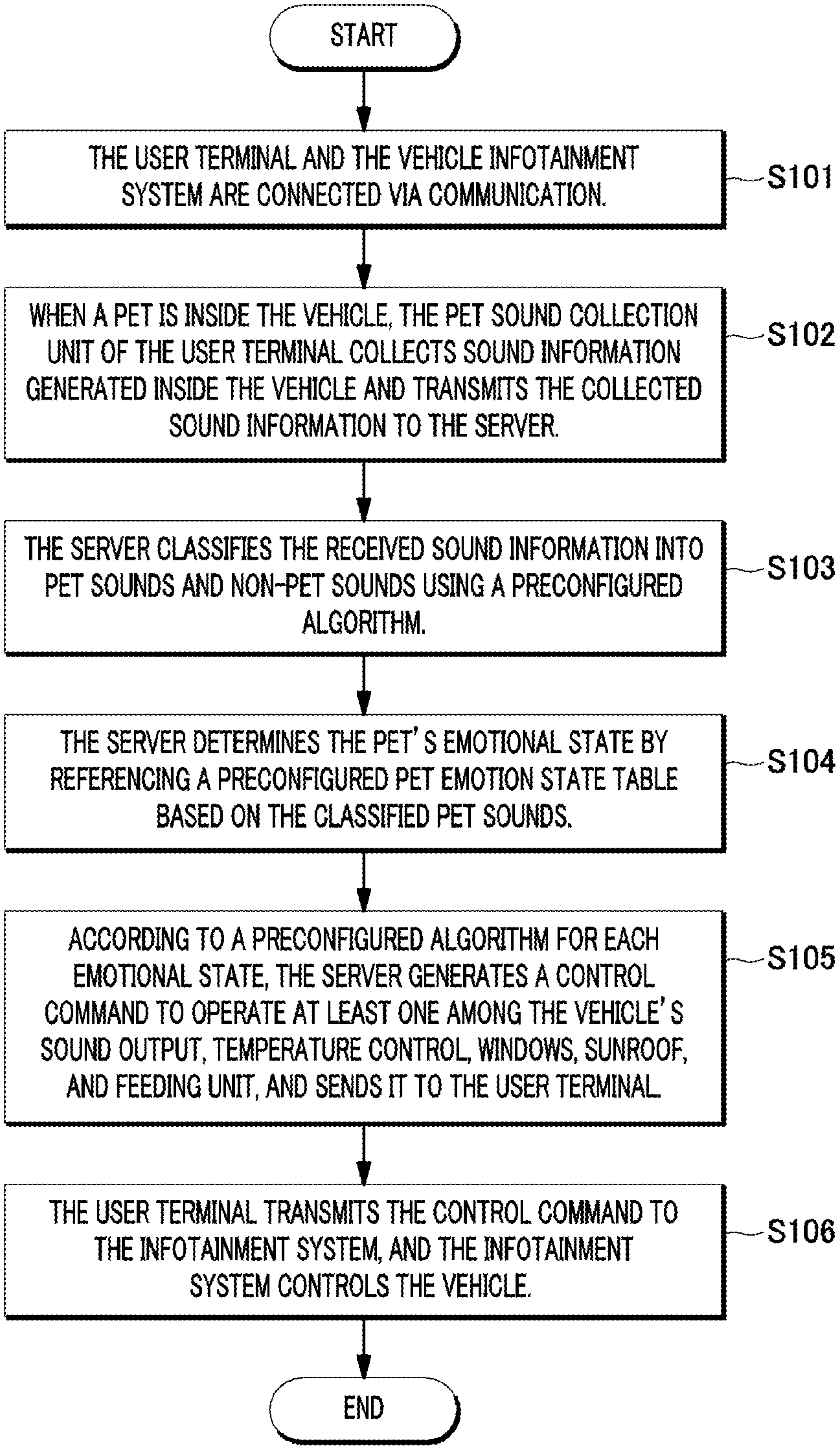
FIG. 6 is a flowchart illustrating the execution of the method for providing pet mode in a vehicle according to an embodiment of the present invention.

Referring to FIG. 6, a more detailed explanation will now be provided regarding the execution sequence of the pet mode providing method according to one embodiment of the present invention.

First, the user terminal (300) and the vehicle's infotainment system (200) establish a communication connection (S101).

The pet audio collection unit (210) of the user terminal (300) collects audio information from inside the vehicle when a pet is present and transmits the collected audio information to the server (100) (S102).

The server (100) classifies the received audio information into pet sounds and other sounds according to a preset algorithm (S103).

Next, the server (100) determines the emotional state of the pet based on the classified pet sounds by referencing a preset pet emotional state table (S104).

Based on the pet's emotional state, the server (100) transmits a command signal to the user terminal (300) to control at least one of the vehicle's audio output unit (220), temperature control unit (230), windows, sunroof, and feeding unit (240), according to a preset algorithm (S105).

Next, the user terminal (300) transmits the command signal to the infotainment system (200), and the infotainment system (200) controls the vehicle (S106).

An embodiment of the present invention may also be implemented in the form of a computer-readable medium comprising computer-executable instructions such as program modules executed by a computer. A computer-readable medium may be any available medium that can be accessed by a computer and includes both volatile and non-volatile media, as well as removable and non-removable media. Furthermore, computer-readable media may include all forms of computer storage media. Computer storage media include all forms of volatile and non-volatile, removable and non-removable media implemented in any method or technology for the storage of information such as computer-readable instructions, data structures, program modules, or other data.

The method and system of the present invention have been described with reference to specific embodiments, but some or all components or operations thereof may be implemented using a computer system having a general-purpose hardware architecture.

The foregoing description of the present invention is for illustrative purposes only. Those skilled in the art to which the present invention pertains will understand that various other specific forms can be implemented without changing the technical spirit or essential features of the present invention. Therefore, the above-described embodiments should be understood as illustrative and not restrictive in any way. For example, components described as being in a single form may be implemented in a distributed manner, and likewise, components described as being distributed may be implemented in a combined form.

The scope of the present invention should be defined by the following claims rather than by the detailed description, and all modifications or variations derived from the meaning, scope, and equivalents of the claims should be interpreted as being included within the scope of the present invention.

What is claimed is:

1. A method for providing a pet mode in a vehicle, performed by a system, comprising:

(a) establishing a communication connection between a user terminal and an infotainment system of the vehicle;

(b) collecting, by a pet sound collection unit of the user terminal, sound information generated inside the vehicle when a pet is present in the vehicle, and transmitting the collected sound information to a server;

(c) distinguishing, by the server, the collected sound information into pet vocalizations and other sounds using a predetermined algorithm;

(d) determining, by the server, an emotional state of the pet with reference to a preconfigured pet emotional state table classifying previously recorded pet vocalizations as indicators of respective pet emotional states;

(e) transmitting, by the server, a command signal to the user terminal that controls at least one or more of a sound output unit, temperature control unit, window, sunroof, and feeding unit of the vehicle according to the emotional state of the pet using a predetermined algorithm; and (f) transmitting, by the user terminal, the command signal to the infotainment system, and controlling the vehicle by the infotainment system, wherein the command signal includes identification information and operation information related to a target component in the vehicle.

2. The method of claim 1 wherein, the pet sound collection unit includes a voice recognition device installed inside the vehicle and connected via wired or wireless communication, a built-in microphone of the vehicle's infotainment system, and a microphone of the user terminal connected to the vehicle via Bluetooth, and comprises a plurality of microphones configured to receive ambient noise, sound generated from specific sound sources, and pet vocalizations and convert them into electrical sound signals.

3. The method of claim 1, wherein step (c) comprises:

(c-1) detecting a voice of an owner of the pet by filtering the sound information; and (c-2) removing noise caused by vehicle operation by further filtering the filtered sound information and excluding the owner's voice.

4. The method of claim 3, wherein step (c) is performed when the server determines that only the pet is present inside the vehicle, and the server determines that only the pet is present when the collected sound information does not include the owner's voice.

5. The method of claim 3, wherein in step (c-2), the server has pre-stored noise data corresponding to vehicle operation by driving state and vehicle model, wherein the driving state is classified into four states of P (Park), D (Drive), R (Reverse), and N (Neutral) according to the vehicle's gear position, and predetermined vehicle speeds and corresponding noise values are stored for each driving state.

6. The method of claim 1, wherein in step (d), the preconfigured pet emotional state table is pre-stored in the server, the preconfigured pet emotional state table matching a plurality of pet emotional states with pitch of pet vocalizations, a preset number of repetitions per unit time, and a duration that a vocalization is maintained.

7. The method of claim 6, wherein the plurality of pet emotional states includes hunger, fear, aggression, defensiveness, excitement, desire, physical satisfaction, emotional satisfaction, request for help, boredom, pain, and lethargy.

8. The method of claim 1, wherein in step (e): the sound output unit outputs an owner's voice corresponding to the pet's emotional state, which is pre-stored in the server, according to a command signal from the server;

the temperature control unit adjusts an air conditioner's temperature according to an air conditioning command signal pre-stored in the server per each pet emotional state, and when a window and a sunroof are cross-opened, the air conditioner operates and performs ventilation;

the window and sunroof are opened and closed according to a command signal from the server, such that they do not open beyond the size of the pet's head, and two windows among multiple windows of the vehicle are cross-opened relative to the center of the vehicle;

the feeding unit controls a feeding device and watering device according to a command signal pre-stored in the server for each pet emotional state.

9. The method of claim 1, further comprising:

(g) providing, to the user terminal, information on the determined pet emotional state and operations of the sound output unit, temperature control unit, and feeding unit as controlled by the server.

10. A system for providing a pet mode in a vehicle, comprising:

a user terminal configured to establish a communication connection with a vehicle's infotainment system and to transmit a command signal to the infotainment system so that the infotainment system controls the vehicle;

a pet sound collection processor configured to collect sound information generated inside the vehicle when a pet is present and to transmit the collected sound information to a server; and a server configured to distinguish the collected sound information into pet vocalizations and other sounds using a predetermined algorithm, determine the pet's emotional state by referring to a pre-stored pet emotional state table, and transmit a command signal to the user terminal and control at least one or more of a sound output unit, temperature control unit, window, sunroof, and feeding unit of the vehicle according to the determined pet emotional state, wherein the command signal includes identification information and operation information related to a target component in the vehicle.

* * * * *